(12) United States Patent
Takemoto et al.

(10) Patent No.: US 10,082,781 B2
(45) Date of Patent: Sep. 25, 2018

(54) MACHINING PROGRAM CREATION APPARATUS FOR WIRE ELECTRICAL DISCHARGE MACHINE

(71) Applicant: FANUC Corporation, Yamanashi (JP)

(72) Inventors: Masanobu Takemoto, Yamanashi (JP); Kaoru Hiraga, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/255,179

(22) Filed: Sep. 2, 2016

(65) Prior Publication Data

US 2017/0068231 A1    Mar. 9, 2017

(30) Foreign Application Priority Data

Sep. 3, 2015  (JP) .................. 2015-173984

(51) Int. Cl.
*G06F 19/00*   (2018.01)
*G05B 19/042*  (2006.01)
(Continued)

(52) U.S. Cl.
CPC ......... *G05B 19/0426* (2013.01); *B23H 7/065* (2013.01); *B23H 7/20* (2013.01);
(Continued)

(58) Field of Classification Search
CPC combination set(s) only.
See application file for complete search history.

(56) References Cited

U.S. PATENT DOCUMENTS 4,530,046 A    7/1985  Munekata et al.
4,644,460 A *  2/1987  Kishi ............... G05B 19/40937
                                                318/568.1
(Continued)

FOREIGN PATENT DOCUMENTS

GB    2187308 A      9/1987
JP    62-198906 A    9/1987
(Continued)

OTHER PUBLICATIONS

Office Action in JP Application No. 2015-173984, dated Dec. 13, 2016.
(Continued)

*Primary Examiner* — Kidest Bahta
(74) *Attorney, Agent, or Firm* — Hauptman Ham, LLP (57) ABSTRACT

A machining program creation apparatus for a wire electrical discharge machine for creating a machining program for cutting a predetermined machining shape in an object to be machined includes a first unit defining the machining shape; a second unit defining a shape of the object to be machined; a third unit designating a reference position to be used when the machining shape is machined; a fourth unit for generating a first machining path for cutting the machining shape based on the machining shape, the shape of the object to be machined, and the machining reference position; a fifth unit for generating the shape of the object to be machined as a second machining path based on the shape of the object to be machined and the machining reference position; and a sixth unit for drawing the first and the second machining paths on the same screen.

4 Claims, 11 Drawing Sheets

(51) Int. Cl.
*B23H 7/20* (2006.01)
*G05B 19/4093* (2006.01)
*G05B 19/402* (2006.01)
*B23H 7/06* (2006.01)

(52) U.S. Cl.
CPC ....... *G05B 19/402* (2013.01); *G05B 19/4093* (2013.01); *B23H 7/06* (2013.01); *B23H 2500/20* (2013.01); *G05B 2219/45221* (2013.01); *Y02P 90/265* (2015.11)

(56) References Cited

U.S. PATENT DOCUMENTS

| | | | | |
|---|---|---|---|---|
| 5,043,550 | A * | 8/1991 | Sakaue | B23H 7/065 |
| | | | | 219/69.12 |
| 5,815,400 | A * | 9/1998 | Hirai | G05B 19/401 |
| | | | | 700/173 |
| 6,112,133 | A * | 8/2000 | Fishman | G05B 19/40937 |
| | | | | 700/180 |
| 6,401,004 | B1 * | 6/2002 | Yamazaki | G05B 19/40937 |
| | | | | 318/568.1 |
| 6,522,941 | B1 * | 2/2003 | Tashiro | B23K 26/0823 |
| | | | | 700/180 |
| 6,642,468 | B2 * | 11/2003 | Kita | B23H 7/02 |
| | | | | 219/69.12 |
| 2009/0143891 | A1 * | 6/2009 | Lin | B23H 1/00 |
| | | | | 700/110 |
| 2015/0183038 | A1 | 7/2015 | Takemoto et al. | |

FOREIGN PATENT DOCUMENTS

| | | |
|---|---|---|
| JP | 2011-22666 A | 2/2011 |
| JP | 2015123537 A | 7/2015 |

OTHER PUBLICATIONS

Extended European Search Report in EP Application No. 16185218.1, dated Feb. 6, 2017.

Office Action in JP application No. 2015-173984, dated Mar. 7, 2017.

* cited by examiner

```
O0100 (KEYWAY)
G00 G90 X-100.0 Y-100.0    MOVE TO CENTER COORDINATES DESIGNATED
G92 X0. Y0.                SET POSITION AS ORIGIN
G00 G90 X8.36755 Y3.5  ⎫
G01 X9.6825 Y3.5       ⎪
X10.6825 Y2.5          ⎪
X20.0 Y2.5             ⎬  CUT KEYWAY SHAPE
X20.0 Y-2.5            ⎪
X10.6825 Y-2.5         ⎪
X9.6825 Y-3.5          ⎪
X8.3675 Y-3.5          ⎭
G00 G90 X0. Y0.            MOVE BACK TO ORIGIN
M30
```

FIG. 2B

```
O0200 (HOLE)
G00 G90 X-100.0 Y-100.0    MOVE TO CENTER COORDINATES DESIGNATED
G92 X0. Y0.                SET POSITION AS ORIGIN
G00 G91 X10.               MOVE TO END OF HOLE
G02 X-20. Y0. I-10. J0. ⎫
X20. Y0. I10. J0.       ⎬  CUT HOLE
G00 X-10.                  MOVE BACK TO ORIGIN
M30
```

FIG. 2C

```
O0001 (KEYWAY MAIN)
IF[#3010NE-1] GOTO100    GO TO N100 IF DRAWING IS NOT BEING PERFORMED
M98 P200                 MACHINING PATH FOR CIRCULAR HOLE
N100 M98 P100            MACHINING PATH FOR KEYWAY
M30
```

FIG. 2D

```
O0001(KEYWAY MAIN)
/M98 P200    MACHINING PATH FOR CIRCULAR HOLE
M98 P100     MACHINING PATH FOR KEYWAY
M30
```

```
O0300(CUT-IN)
#33=10.0/2                    DISTANCE (VERTICAL DIRECTION) FROM RECTANGULAR HOLE CENTER TO END FACE
#32=20.0/2                    DISTANCE (HORIZONTAL DIRECTION) FROM RECTANGULAR HOLE CENTER TO END FACE
#31=10.0/2+1.0/SQRT[2]        DISTANCE (VERTICAL DIRECTION) FROM RECTANGULAR HOLE CENTER TO SLIT END POINT
#30=20.0/2+1.0/SQRT[2]        DISTANCE (HORIZONTAL DIRECTION) FROM RECTANGULAR HOLE CENTER TO SLIT END POINT
G00 G90 X-100.0 Y-100.0       MOVE TO CENTER COORDINATES DESIGNATED
G92 X0 Y0                     SET POSITION AS ORIGIN
G00 G90 Y#33              ⎫
X-#32                     ⎪
G01 X-#30 Y#31            ⎪
X-#32 Y#33                ⎪
G00 Y-#33                 ⎪
G01 X-#30 Y-#31           ⎬   CUT SLITS
X-#32 Y-#33               ⎪
G00X#32                   ⎪
G01X#30 Y-#31             ⎪
X#32 Y-#33                ⎪
G00 Y#33                  ⎪
G01 X#30 Y#31             ⎪
X#32 Y#33                 ⎭
G00 X0.0 Y0.                  MOVE BACK TO ORIGIN
M30
```

FIG. 9B

```
O0400(Rectangle)
#33=10.0/2              DISTANCE (VERTICAL DIRECTION) FROM RECTANGULAR HOLE CENTER TO END FACE
#32=20.0/2              DISTANCE (HORIZONTAL DIRECTION) FROM RECTANGULAR HOLE CENTER TO END FACE
G00 G90 X-100.0 Y-100.0 MOVE TO CENTER COORDINATES DESIGNATED
G92X0Y0                 SET POSITION AS ORIGIN
G00G90X0.Y#33       ⎫
G01X-#32Y-#33       ⎪
X-#32Y-#33          ⎬   CUT RECTANGLE
X#32Y-#33           ⎪
X#32Y#33            ⎪
X0.Y#33             ⎭
G00X0.0Y0.
M30                     MOVE BACK TO ORIGIN
```

FIG. 9C

```
O0002(CUT-IN MAIN)
IF[#3010NE-1] GOTO100   GO TO N100 IF DRAWING IS NOT BEING PERFORMED
M98 P400                MACHINING PATH FOR RECTANGULAR HOLE
N100 M98 P300           MACHINING PATH FOR SLITS
M30
```

FIG. 10A

MACHINING PROGRAM CREATION APPARATUS FOR WIRE ELECTRICAL DISCHARGE MACHINE

RELATED APPLICATIONS

The present application claims priority to Japanese Patent Application Number 2015-173984, filed Sep. 3, 2015, the disclosure of which is hereby incorporated by reference herein in its entirety.

BACKGROUND OF THE INVENTION

1. Field of the Invention

The present invention relates to a machining program creation apparatus for a wire electrical discharge machine (EDM).

2. Description of the Related Art

Japanese Patent Application Laid-Open No. 2015-123537 discloses a machining path generator for keyway cutting for a wire electrical discharge machine. In a machining program creation apparatus for a wire electrical discharge machine, a machining shape and a machining position are designated in order to generate a machining path. For example, in the case where a keyway shape is formed, a keyway width and a keyway depth are designated as a machining shape, and the diameter of a circular hole already formed in an object to be machined and center coordinates of the circular hole are designated as a machining position. An operator generates a machining path using this machining program creation apparatus.

Then, the operator draws a machining path using a machining path drawing device in order to check whether or not the generated machining path is correct. The machining path drawing device draws figures such as a straight line and a circular arc in accordance with the machining path. At this time, the machining path drawing device makes a drawing in accordance with the machining path, and therefore does not draw figures not included in the machining path such as a figure of the circular hole already formed in the object to be machined.

After checked the machining path using the machining path drawing device, the operator sets an NC program corresponding to the machining path in the wire electrical discharge machine, and then starts a machining operation to machine the object to be machined.

Figure 1:
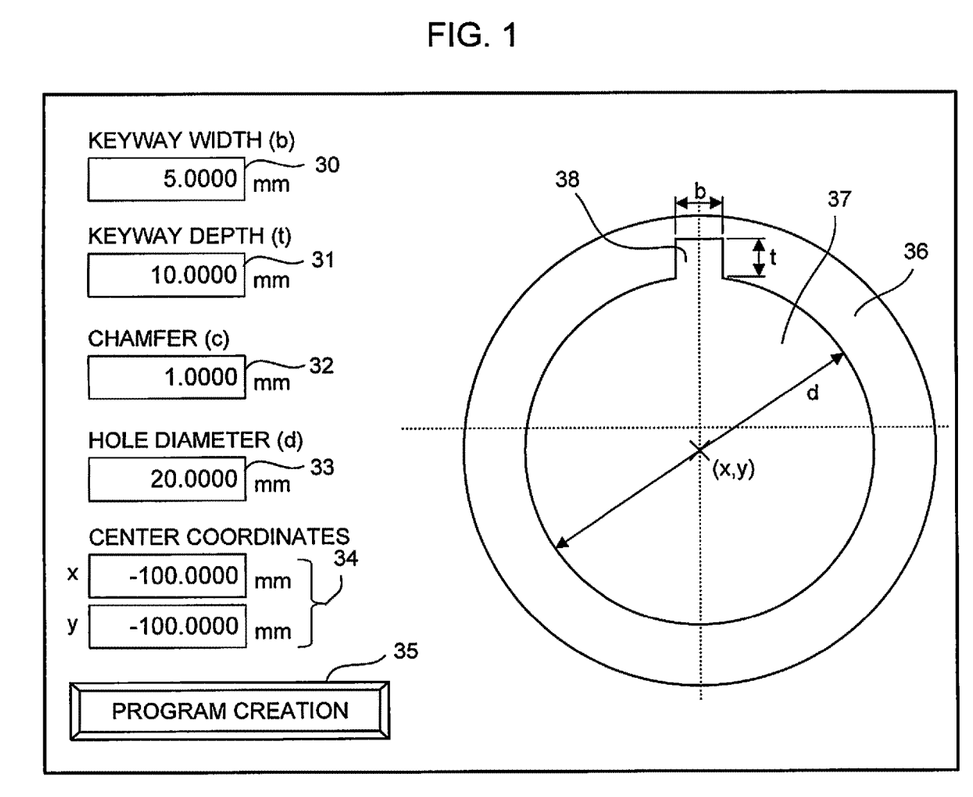
FIG. 1 is a view showing one example of an input screen of a machining path generator for keyway cutting in a wire electrical discharge machine.

FIG. 1 shows one example of an input screen of a machining path generator for keyway cutting in a wire electrical discharge machine.

The operator effects the following data input operation
Machining dimensions of a keyway are inputted to "keyway width (b)" and "keyway depth (t)".
Provided an entrance of the keyway is desired to be chamfered, an appropriate dimension is inputted to "chamfer (c)"
The diameter of a circular hole already formed in an object to be machined is inputted to "hole diameter (d)".
A center position (coordinate position on the wire EDM machine) of the circular hole is inputted to "center coordinates".

Figure 2A:
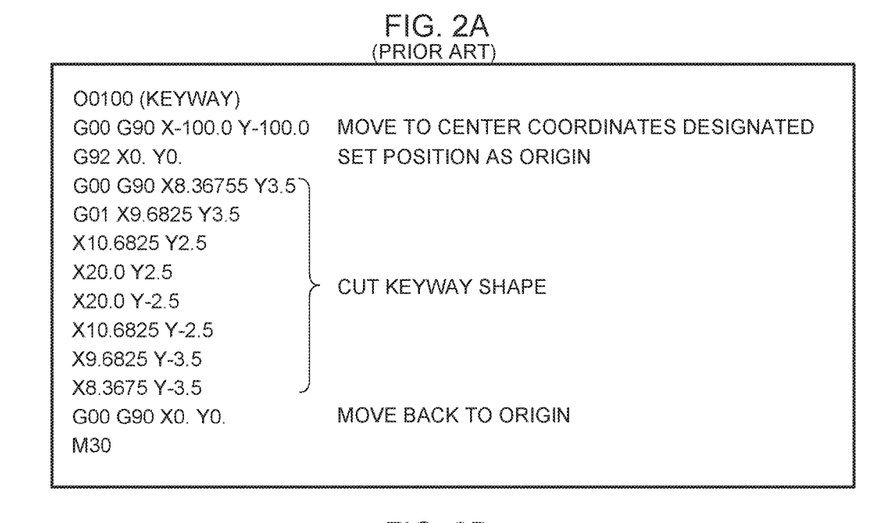
FIG. 2A is a view showing an example of a program for cutting a keyway shape.

When a "program creation" button is pressed after the above-described pieces of data are inputted, a machining path (NC program) for keyway cutting such as shown in FIG. 2A is generated.

Figure 3:
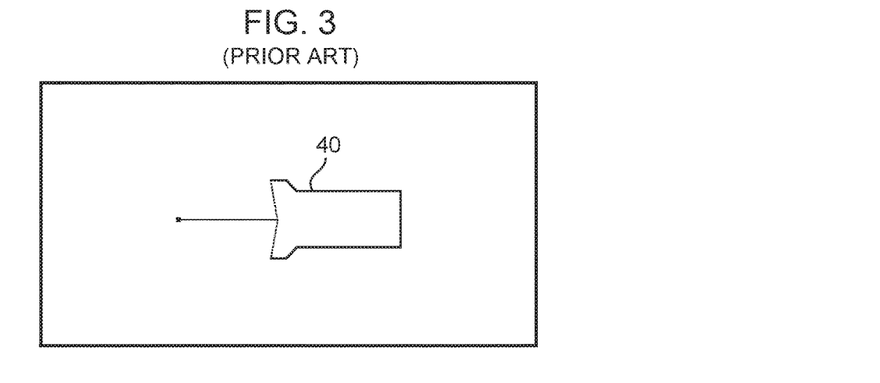
FIG. 3 shows an example in which the machining path (NC program) in FIG. 2A is drawn.

Then, the operator draws the generated machining path using a machining path drawing device. FIG. 3 shows an example in which the machining path (NC program) in FIG. 2A is drawn. The operator checks whether or not the machining path is correct with reference to figures drawn on the screen.

Figure 4:
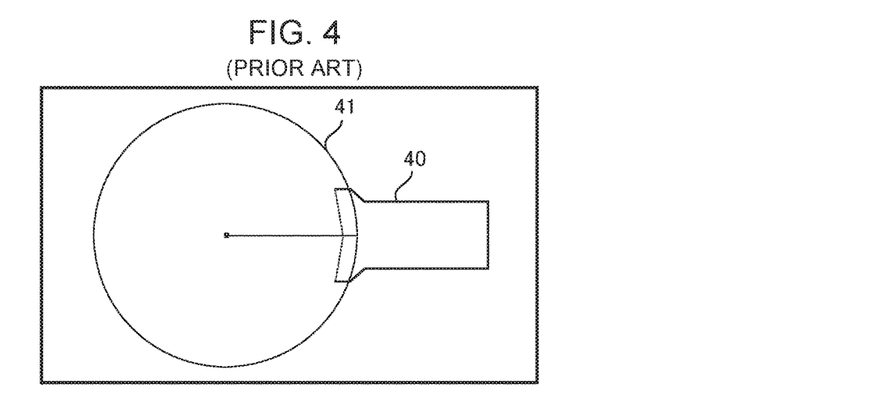
FIG. 4 is a view for explaining that drawing the shape of the circular hole provided in the object to be machined enables the machining shape and the machining position of the keyway to be checked.

After checked the machining path, the operator sets the NC program checked through the drawing in the wire electrical discharge machine, and starts a machining operation to machine the object to be machined. As described previously, the operator confirms the machining path through the drawn figures. However, in the drawing shown in FIG. 3, the operator can check a machining shape 40 of the keyway, but cannot check where the keyway is machined in the circular hole of the object to be machined. If, for example, a figure (figure 41 of the circular hole of the object to be machined) such as shown in FIG. 4 is drawn, the operator can confirm the machining shape and the machining position of the keyway with respect to the circular hole.

Generally, a machining path drawing device is adapted to draw figures as specified by a machining path (NC program) on a screen of a display device thereof, and cannot draw a figure not included in the machining path (NC program). For example, in FIG. 4, since the figure of the circular hole of the object to be machined, which is not a machining path, cannot be drawn, the positional relationship between the circular hole already formed in the object to be machined and the keyway shape cannot be confirmed by drawing.

Specifically, the positional relationship between the already formed circular hole and the keyway cannot be confirmed in a drawing on the display screen of the display device provided in the machining path drawing device.

Accordingly, it is difficult for the operator to easily and simply check the machining position (where the keyway is machined in the circular hole of the object to be machined) of the keyway. Thus, there has been a problem that the keyway is machined at an incorrect position and that machining has to be performed again.

SUMMARY OF THE INVENTION

Accordingly, an object of the present invention is to solve the above-described problem of the prior art technique, by providing a machining program creation apparatus having a function for drawing a shape of an object to be machined as well as a machining path.

The present invention is characterized in that a dummy machining path for drawing a shape of an object to be machined is generated using a generic machining path drawing device for drawing a machining path to draw the shape of the object to be machined which is not an actual machining path.

Methods

In the present invention, based on a defined machining shape, a defined shape of an object to be machined, and a reference position for cutting a machining shape, a machining path for cutting the defined machining shape is generated (first machining path generator). Moreover, based on the above-described shape of the object to be machined and the above-described reference position, a machining path corresponding to the shape of the object to be machined is generated (second machining path generator).

The machining paths generated by the first and second machining path generators are drawn using a machining path drawing device. Since the shape of the object to be machined is also generated as a machining path as well as the machining path for the machining shape, even a generic machining path drawing device can draw both machining paths without discrimination. As a result, the machining shape and the shape of the object to be machined are to be drawn in thus drawn figure drawn, and the machining position of the machining shape can be confirmed.

Of the generated machining paths, the machining path corresponding to the shape of the object to be machined is designed to work only in a machining path drawing device and have no effect on a machining operation. Accordingly, there is no chance to cut or machine a path corresponding to the shape of the object to be machined.

Further, a machining program creation apparatus for a wire electrical discharge machine according to the present invention is configured to create a machining program for cutting a predetermined machining shape in an object to be machined. This machining program creation apparatus includes a machining shape definition unit defining the machining shape; a workpiece shape definition unit defining a shape of the object to be machined; a machining reference position designation unit designating a reference position to be used when the machining shape is machined; a first machining path generation unit for generating a first machining path for cutting the machining shape based on the machining shape, the shape of the object to be machined, and the machining reference position; a second machining path generation unit for generating the shape of the object to be machined as a second machining path based on the shape of the object to be machined and the machining reference position; and a machining path drawing unit for drawing the first and second machining paths. The machining path drawing unit draws the first machining path and the second machining path on a same screen.

Moreover, a machining program creation apparatus for a wire electrical discharge machine according to the present invention is configured to create a machining program for cutting a keyway in a side surface of a circular hole. This machining program creation apparatus includes a machining shape definition unit defining a shape of the keyway; a workpiece shape definition unit designating a diameter of the circular hole; a machining reference position designation unit designating a center position of the circular hole; a first machining path generation unit for generating a first machining path for cutting the keyway based on the shape of the keyway, the diameter of the circular hole, and the center position of the circular hole; a second machining path generation unit for generating the shape of the circular hole as a second machining path based on the diameter of the circular hole and the center position of the circular hole; and a machining path drawing unit for drawing the first and second machining paths. The machining path drawing unit draws the first machining path and the second machining path on a same screen.

The second machining path is a machining path for drawing. Moreover, the first machining path and the second machining path may be drawn in different ways of displaying.

According to the invention of the present application, a machining program creation apparatus can be provided which has a function that draws a shape of an object to be machined as well as a machining path.

BRIEF DESCRIPTION OF THE DRAWINGS

These and the other objects and features of the present invention will become apparent from the following description of exemplary embodiments with reference to the accompanying drawings in which.

DETAILED DESCRIPTION OF THE PREFERRED EMBODIMENTS

The embodiments of the present invention will now be described with reference to the drawings. It should be noted that FIGS. 1 and 2A referred hereinabove for the explanation of the prior art are also employed in the explanation of the present invention, since those illustrated thereon are substantially the same as those employed in both technique. Moreover, similar components will be denoted by the same reference characters in the explanation.

Figure 5:
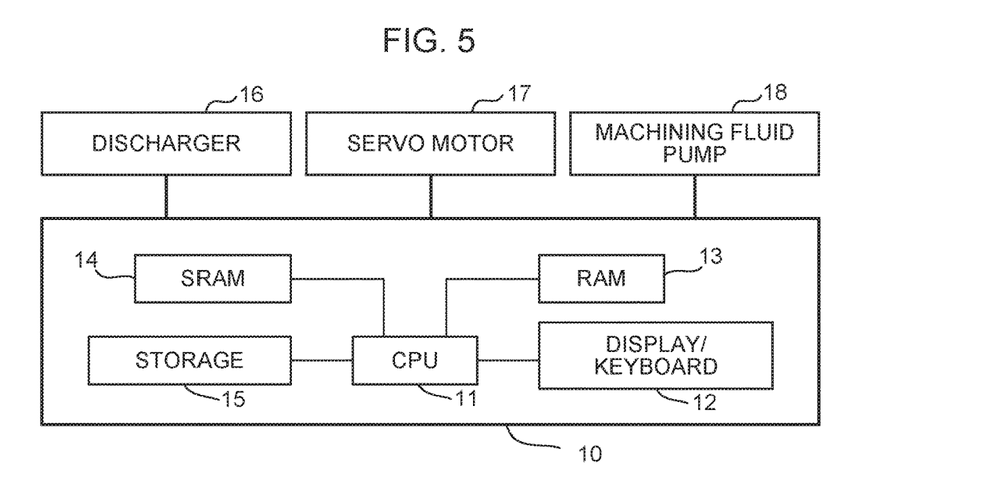
FIG. 5 is a block diagram showing a wire electrical discharge machine controlled by a numerical controller.

FIG. 5 is a schematic diagram of a numerical controller mounted on a wire electrical discharge machine. The numerical controller 10 includes a processor (CPU) 11, a display/keyboard 12, a RAM 13, an SRAM 14, and a storage 15.

Example 1: Example of Keyway Cutting

A machining path generator is installed on a numerical controller 10 mounted on the wire electrical discharge machine. The machining path generator generates a machining program for keyway cutting based on data inputted through the display/keyboard 12. Data (keyway width, keyway depth, chamfer) in a machining shape definition unit, data (hole diameter) in a workpiece shape definition unit, and data (center coordinates) in a machining reference position designation unit which are inputted through the display/keyboard 12 are stored in the storage 15 or the SRAM 14. The machining path generator (software for generating a machining path) is registered on the storage 15 and, after the numerical controller 10 is turned on, copied to the RAM 13 to be executed using the CPU 11.

The generated machining path (NC program) is stored in the storage 15 or the SRAM 14. When the generated machining path (NC program) is drawn, the CPU 11 analyzes the NC program and displays the machining path on a display of the display/keyboard 12.

Moreover, when the generated machining path (NC program) is executed, the CPU 11 analyzes the NC program and issues commands to a discharger 16, a servo motor 17, and a machining fluid pump 18. The discharger 16, the servo motor 17, and the machining fluid pump 18 operate based on the commands, and the wire electrical discharge machine moves a discharging wire with ejecting machining fluid to machine an object to be machined.

FIG. 1 shows a screen used for generating a machining path for keyway cutting in the numerical controller 10. When data is inputted and then a program creation button 35 is pressed, a machining path (NC program) is generated. When the generated machining path (NC program) is drawn, a figure of the machining path such as shown in FIG. 4 is displayed. It should be noted that reference numeral 30 denotes an input box for keyway width (b), reference numeral 31 denotes an input box for keyway depth (t), reference numeral 32 denotes an input box for chamfer (c), reference numeral 33 denotes an input box for hole diameter (d), and reference numeral 34 denotes input boxes for center coordinates (x, y). In FIG. 1, a workpiece 36 with a hole 37 is also displayed with a keyway 38 provided therein. It should be noted that a shape of the workpiece 36 is merely an image displayed in any appropriate scale and the like.

First, an operator inputs "keyway width (b)" and "keyway depth (t)" on the screen of the machining path generator as shown in FIG. 1 in order to designate a keyway shape. In the case where an entrance of the keyway is desired to be chamfered, "chamfer (c)" is also inputted. Then, "hole diameter (d)" is inputted in order to designate the shape of an object to be machined. The object to be machined is thus described a workpiece having a circular hole formed therethrough, and the keyway shape is adapted to be machined in the circular hole. Accordingly, it is only necessary to input a hole diameter as minimal data on the shape of the object to be machined (data on the external shape of the workpiece have no relation with a machining path and need not be inputted). Subsequently, "center coordinates (x, y)" are inputted in order to designate the machining position of the keyway. Although in the above mentioned example, the center coordinates are inputted through the screen, a wire electrode or a touch probe may be brought into contact with the object to be machined to measure a center position of the circular hole and thus obtained coordinates of the measured center position are to be used. Finally, a program creation button is pressed. At this time, a machining path (NC program) is generated in accordance with the following procedure.

First, a machining path generation unit 1 acquires all data inputted through the screen such as the data (keyway depth, keyway width, chamfer) in the machining shape definition unit, the data (hole diameter) in the workpiece shape definition unit, and the data (hole center coordinates) in the machining reference position designation unit. Based on the acquired data, a machining path (NC program) for keyway cutting such as shown in FIG. 2A is generated.

Figure 2B:
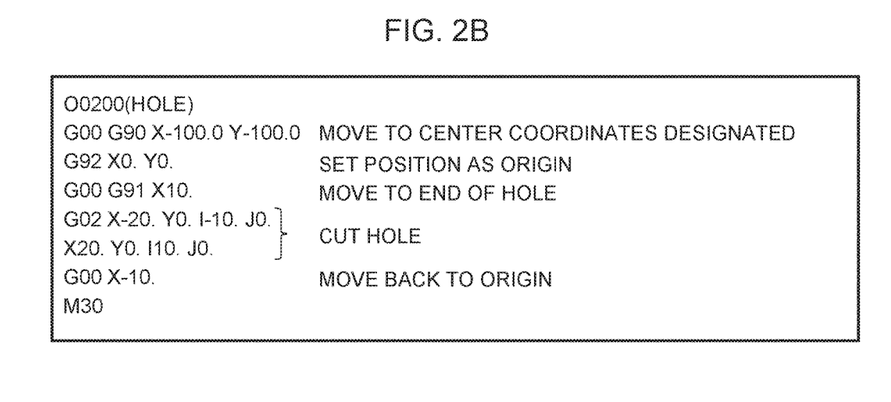
FIG. 2B is a view showing an example of a machining path (NC program) corresponding to a circular hole of an object to be machined.
Figure 2C:
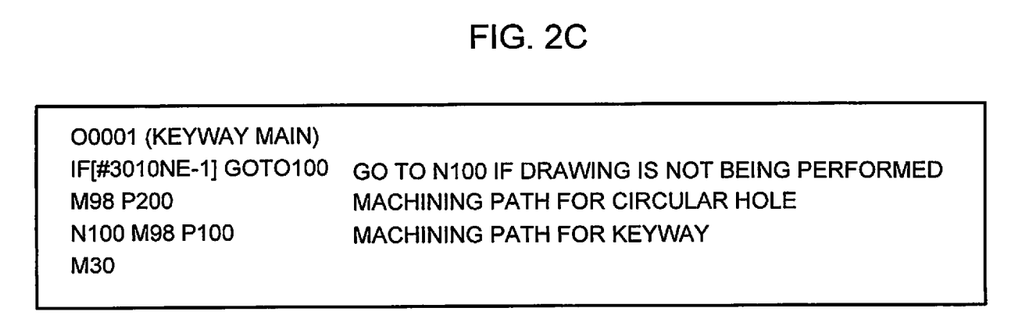
FIG. 2C is a view showing an example of a main program for calling machining paths for the circular hole and the keyway.

Then, a machining path generation unit 2 acquires data (hole diameter) in the workpiece shape definition unit and data (hole center coordinates) in the machining reference position designation unit. These data had already been inputted through the screen. Based on the acquired data, a machining path (NC program) such as shown in FIG. 2B is generated which corresponds to the circular hole of the object to be machined. When the generation of the machining paths (NC programs) is finished, the operator selects a main program such as shown in FIG. 2C and performs drawing. This main program may be created by the machining path generation unit 1 or 2 when the program creation button is pressed, or may be prepared on the storage 15 or the SRAM 14 in advance.

When drawing is executed, the numerical controller 10 assigns −1 to the macro variable #3010.

The machining path drawing device analyzes the selected main program and draws a machining path. At this time, since #3010=−1, machining paths (NC programs) of O200 and O100 are drawn, so that the keyway and the circular hole shape are drawn. Drawing a first machining path and a second machining path in different ways of displaying helps the operator to discriminate between the first machining path and the second machining path (for drawing). It is recommended to display the two paths in different ways of displaying by a technique such as drawing in different colors, drawing in different line widths, or blinking.

When drawing is finished, the numerical controller 10 assigns 0 to the macro variable #3010. In the case where the main program is executed for a machining operation, since #3010=0, the machining path (O200) for the circular hole is not executed, and only the machining path (O100) for the keyway is executed.

Figure 2D:
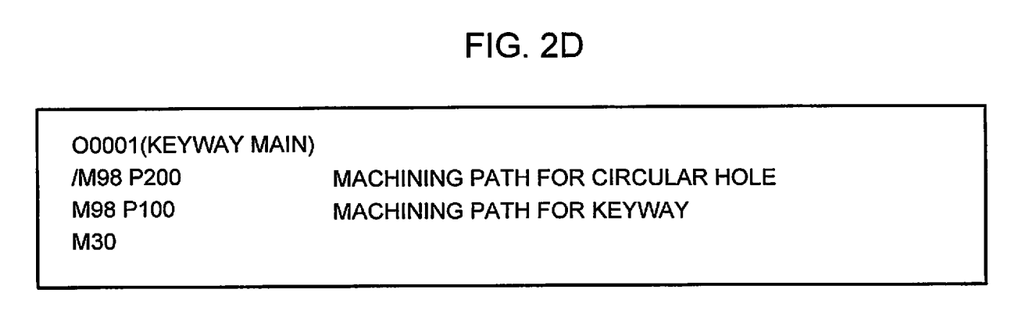
FIG. 2D is a view showing an example of a main program for calling the machining paths for the circular hole and the keyway.

It should be noted that though the macro variable #3010 is used in FIG. 2C to determine whether or not the drawing and machining of the circular hole is executed, an optional skip "I" may be added to a circular hole drawing and machining command (M98P200) as in FIG. 2D. The optional skip is turned off (M98P200 is executed) when drawing is performed, and is turned on (M98P200 is not executed) otherwise.

Figure 6A:
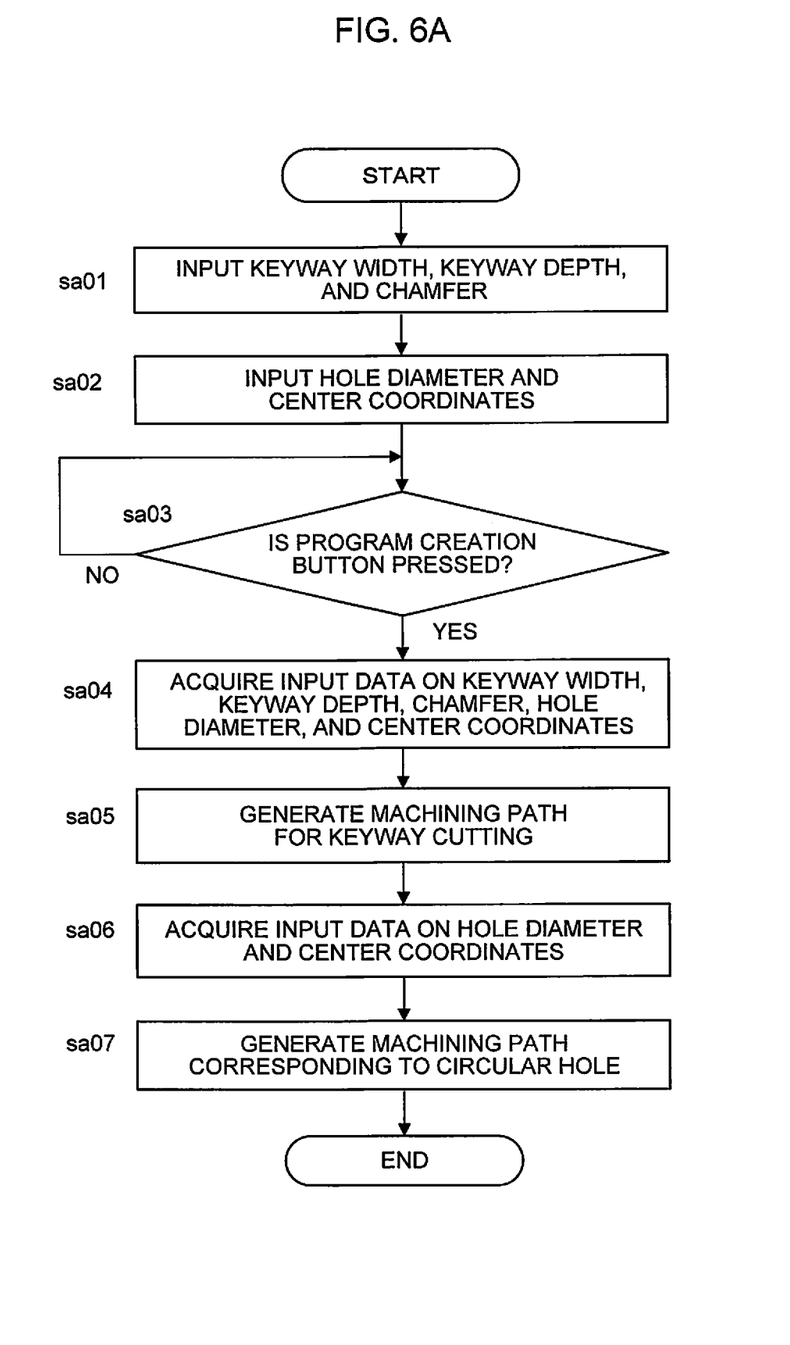
FIG. 6A is a flowchart showing a process for machining path generation in keyway cutting.

FIG. 6A is a flowchart showing a process for machining path generation in keyway cutting process. Each step in the flowchart will now be described as follows.

[Step sa01] An operator inputs data on keyway width, keyway depth, and chamfer.

[Step sa02] The operator inputs hole diameter and center coordinates.

[Step sa03] The operator presses the program creation button. The machining path generator determines whether or not the program creation button has been pressed. If the button has been pressed (YES), the machining path generator goes to step sa04. If the button has not been pressed (NO), the machining path generator waits for the button to be pressed.

[Step sa04] Input data on keyway width, keyway depth, chamfer, hole diameter, and center coordinates are acquired.

[Step sa05] A machining path for keyway cutting is generated.

[Step sa06] Input data on hole diameter and center coordinates are acquired.

[Step sa07] A machining path corresponding to the circular hole is generated, and the process is ended.

Figure 6B:
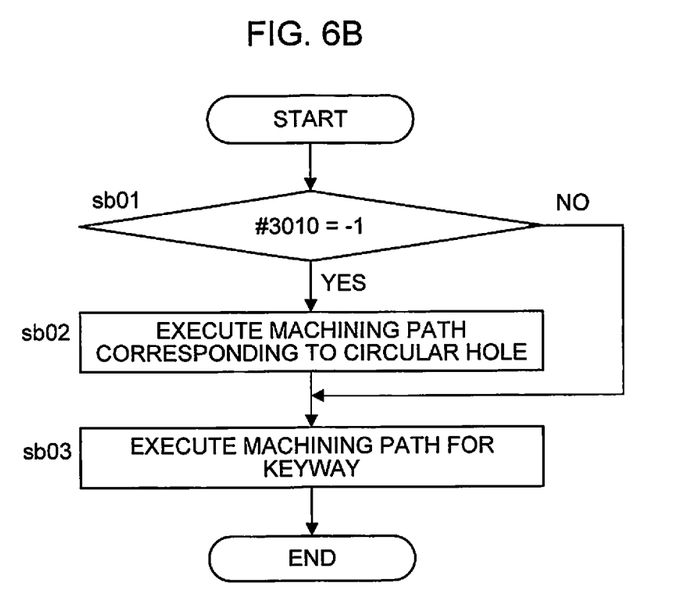
FIG. 6B is a flowchart showing the processing of a machining path (NC program) at the time of a drawing and machining operation in keyway cutting.

FIG. 6B is a flowchart showing the processing of a machining path (NC program) upon performing a drawing and machining operation in keyway cutting. Each step in the flowchart will now be described as follows.

[Step sb01] A determination is made as to whether or not the macro variable #3010 is −1 (minus 1). If the macro variable #3010 is −1 (minus 1) (YES), the process goes to step sb02. If the macro variable #3010 is not −1 (minus 1) (NO), the process goes to step sb03.

[Step sb02] The machining path corresponding to the circular hole is executed.

[Step sb03] The machining path for the keyway is executed, and the process is ended.

Example 2: Example of Slit Cutting

A machining path generator is installed on a numerical controller mounted on a wire electrical discharge machine. The machining path generator generates a slit cutting program based on data inputted through the display/keyboard 12.

FIG. 5 is a schematic diagram of a numerical controller mounted on a wire electrical discharge machine. Data (slit depth) in a machining shape definition unit, data (rectangular hole vertical and horizontal lengths) in a workpiece shape definition unit, and data (rectangular hole center coordinates) in a machining reference position designation unit which are inputted through the display/keyboard 12 are stored in the storage 15 or the SRAM 14.

The machining path generator (software for generating a machining path) is registered on the storage 15 and, after the numerical controller 10 is turned on, copied to the RAM 13 to be executed using the CPU 11. The generated machining path (NC program) is stored in the storage 15 or the SRAM 14.

When the generated machining path (NC program) is drawn, the CPU 11 analyzes the NC program and displays the machining path on a display of the display/keyboard 12. Moreover, when the generated machining path (NC program) is executed, the CPU 11 analyzes the machining program and issues commands to a discharger 16, a servo motor 17, and a machining fluid pump 18. The discharger 16, the servo motor 17, and the machining fluid pump 18 operate based on the commands, and the wire electrical discharge machine moves a discharging wire with ejecting machining fluid to machine an object to be machined.

Figure 7:
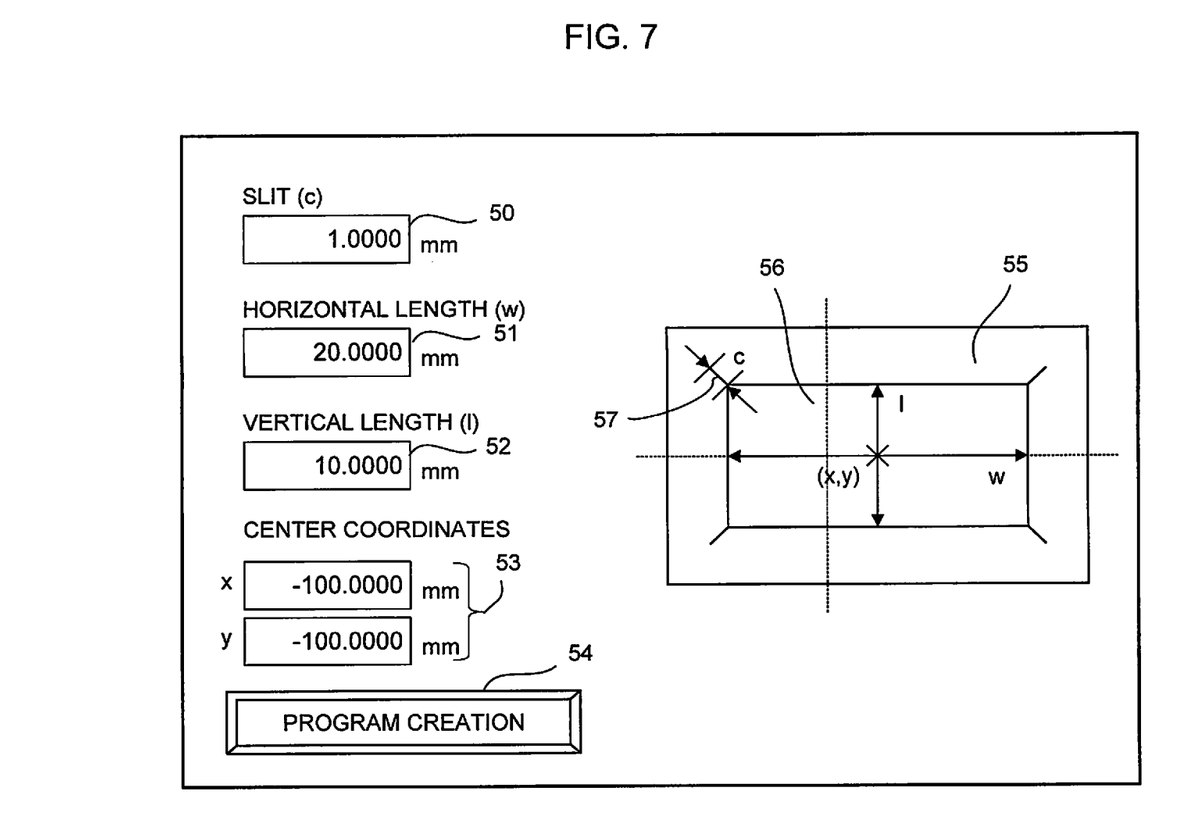
FIG. 7 is a view showing one example of an input screen of a machining path generator for generating a machining path for slit cutting in the numerical controller.

FIG. 7 shows one example of an input screen of a machining path generator for generating a machining path for slit cutting in the numerical controller. Reference numeral 50 denotes an input box for the depth of a slit (c), reference numeral 51 denotes an input box for the length of a width (w), reference numeral 52 denotes an input box for a vertical length (l), and reference numeral 53 denotes input boxes for center coordinates (x, y).

Figure 8:
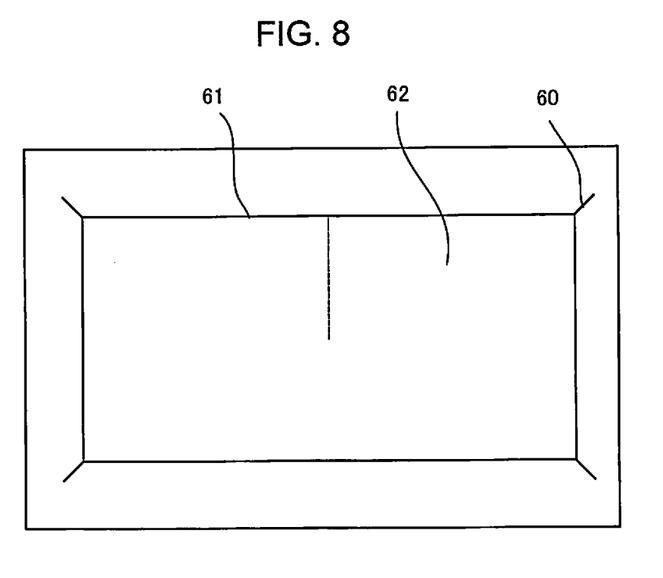
FIG. 8 is a view for explaining that drawing a shape of a rectangular hole provided in an object to be machined enables machining positions for slit cutting to be checked.

When data are inputted and a program creation button 54 is pressed, a machining path (NC program) is generated. When the generated machining path (NC program) is drawn, a figure of the machining path such as shown in FIG. 8 is displayed. Reference numeral 62 denotes a rectangular hole, and reference numeral 60 denotes a slit. A detailed description will be made below.

First, as shown in FIG. 7, the operator inputs "slit (c)" on the screen in order to designate a slit depth. Then, "horizontal length (w)" and "vertical length (l)" of the rectangular hole are inputted in order to designate a shape of an object to be machined. The object to be machined is thus defined as a workpiece having a rectangular hole formed therethrough, and slits are adapted to be cut from four corners of the rectangular hole. Accordingly, it is only necessary to input vertical and horizontal dimensions of the rectangular hole as minimal data on the shape of the object to be machined (data on the external shape of the workpiece have no relation with a machining path and need not be inputted). Subsequently, "center coordinates (x, y)" are inputted in order to designate the machining positions of the slits. Finally, a program creation button is pressed. At this time, a machining path (NC program) is generated in accordance with the following procedure.

Figure 9A:
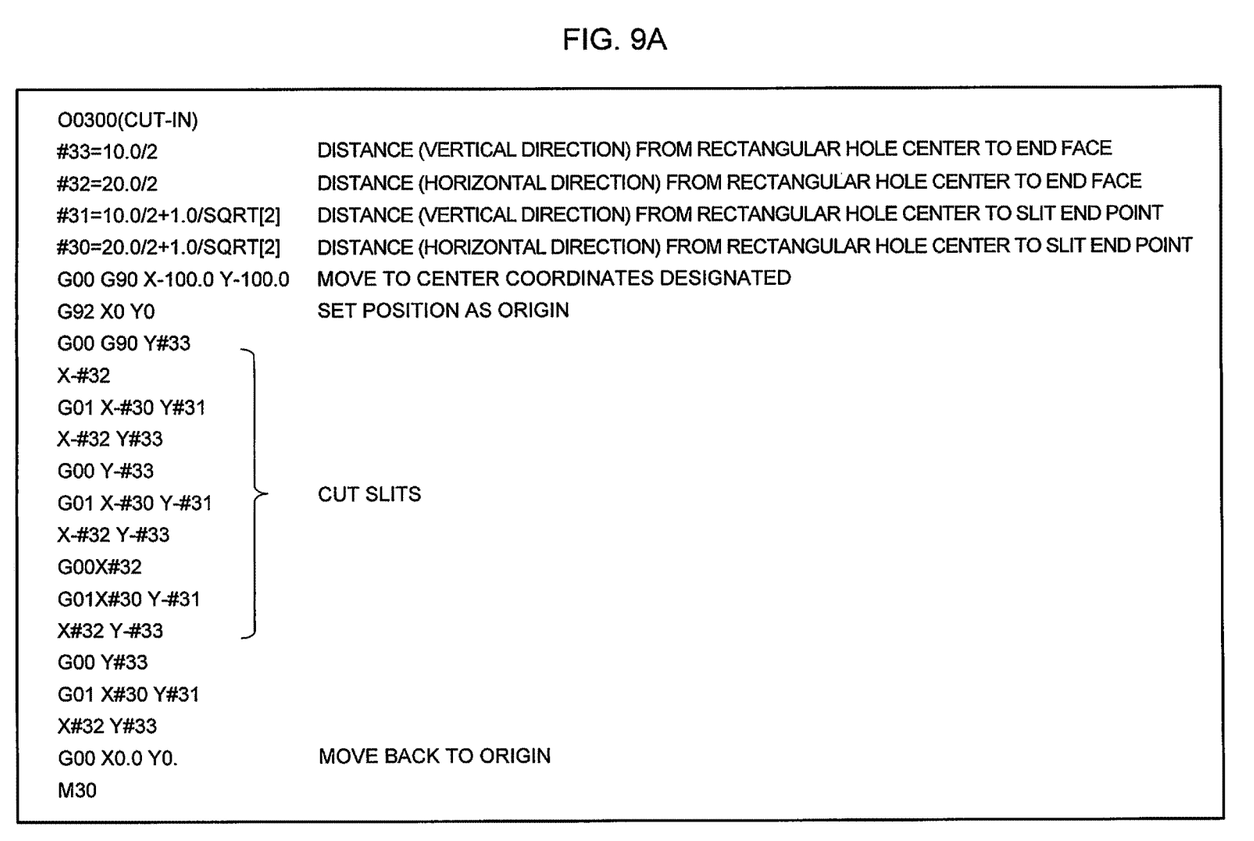
FIG. 9A is a view showing an example of a machining path (NC program) for slit cutting.
Figure 9B:
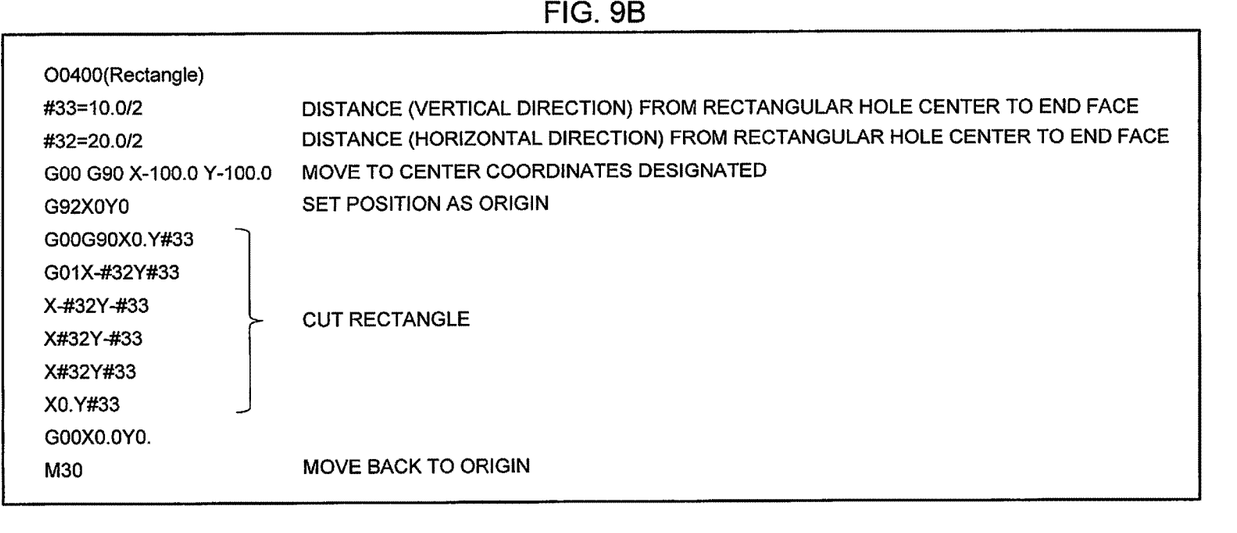
FIG. 9B is a view showing an example of a machining path (NC program) corresponding to the rectangular hole of the object to be machined.
Figure 9C:
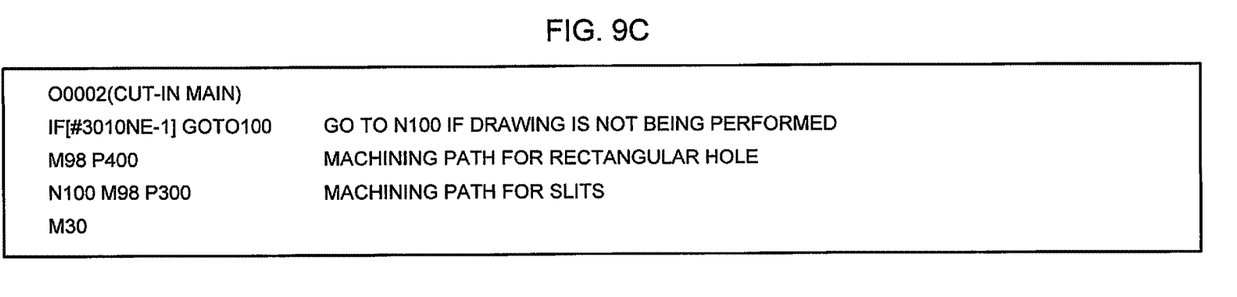
FIG. 9C is a view showing an example of a main program for calling the machining paths for the rectangular hole and slits.

First, the machining path generation unit 1 acquires all data inputted through the screen such as data (slit) in the machining shape definition unit, data (vertical length and horizontal length) in the workpiece shape definition unit, and data (rectangular hole center coordinates) in the machining reference position designation unit. Based on the acquired data, a machining path (NC program) for slit cutting such as shown in FIG. 9A is generated. Then, the machining path generation unit 2 acquires data (vertical length and horizontal length) in the workpiece shape definition unit and data (rectangular hole center coordinates) in the machining reference position designation unit. These data had already been inputted through the screen. Based on the acquired data, a machining path (NC program) such as shown in FIG. 9B is generated which corresponds to the rectangular hole of the object to be machined. When the generation of the machining paths (NC programs) is finished, the operator selects a main program such as shown in FIG. 9C and performs drawing. This main program may be created by the machining path generation unit 1 or 2 when the program creation button is pressed, or may be prepared on the storage 15 or the SRAM 14 in advance.

When drawing is executed, the numerical controller 10 assigns −1 to the macro variable #3010. The machining path drawing device analyzes the selected main program and draws a machining path. At this time, since #3010=−1, machining paths (NC programs) of O400 and O300 are drawn, so that the slits and the rectangular hole shape are drawn. When drawing is finished, the numerical controller 10 assigns 0 to the macro variable #3010. In the case where the main program is executed for a machining operation, since #3010=0, the machining path (O400) for the rectangular hole is not executed, and only the machining path (O300) for the slits is executed.

Figure 10A:
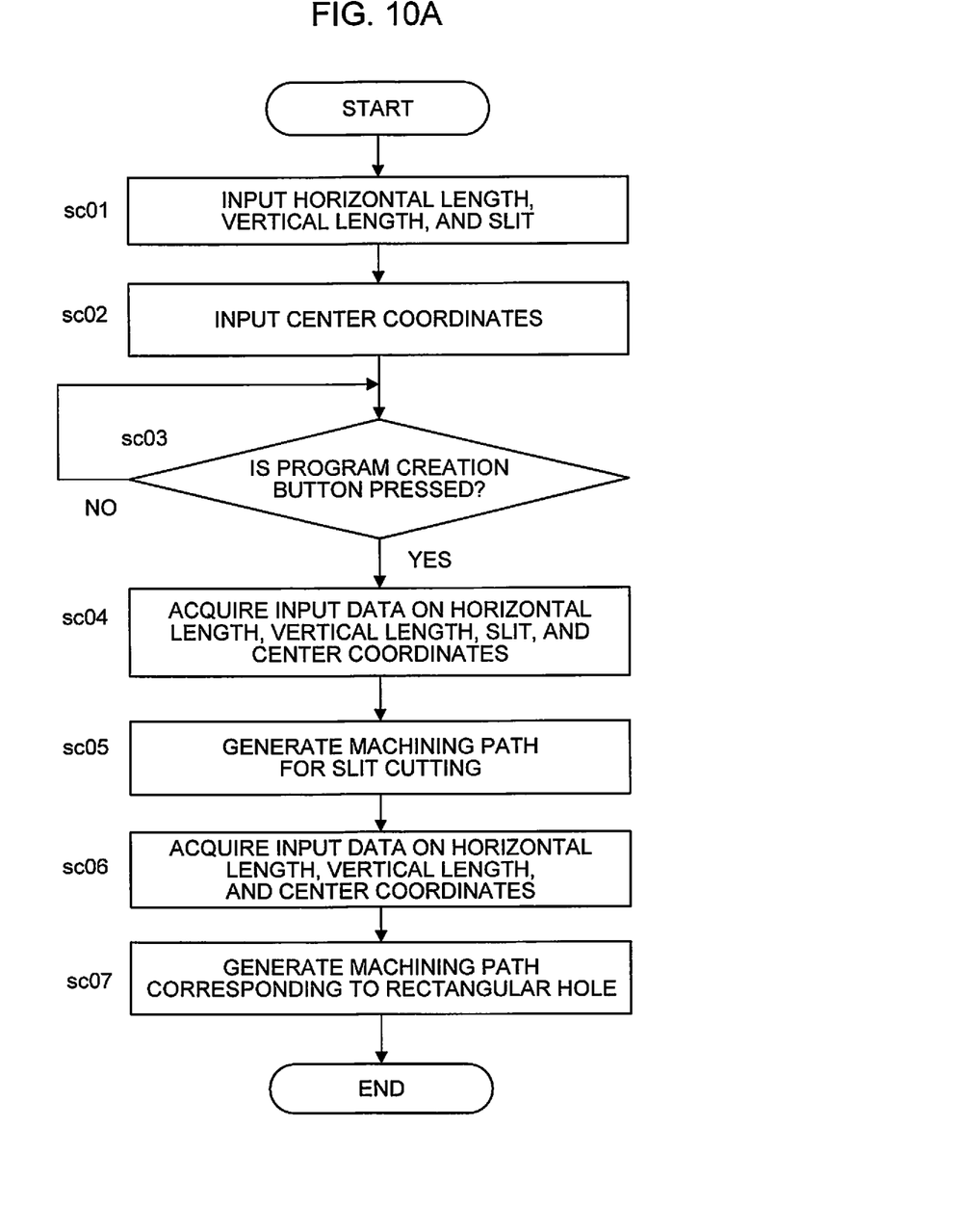
FIG. 10A is a flowchart showing a process for machining path generation in slit cutting.

FIG. 10A is a flowchart showing a process for machining path generation in slit cutting.

[Step sc01] An operator inputs data on horizontal length, vertical length, and slit.

[Step sc02] The operator inputs center coordinates.

[Step sc03] The operator presses the program creation button. The machining path generator confirms whether or not the program creation button has been pressed. If the button has been pressed (YES), the machining path generator goes to step sc04. If the button has not been pressed (NO), the machining path generator waits for the button to be pressed.

[Step sc04] Input data on horizontal length, vertical length, slit, and center coordinates are acquired.

[Step sc05] A machining path for slit cutting is generated.

[Step sc06] Input data on horizontal length, vertical length, and center coordinates are acquired.

[Step sc07] A machining path corresponding to the rectangular hole is generated, and the process is ended.

Figure 10B:
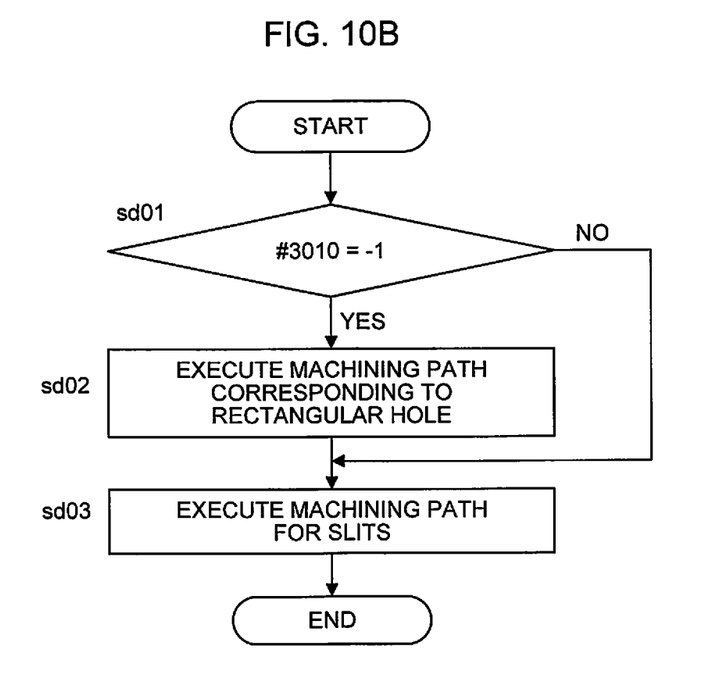
FIG. 10B is a flowchart showing the processing of a machining path (NC program) at the time of a drawing and machining operation in slit cutting.

FIG. 10B is a flowchart showing the processing of a machining path (NC program) upon performing a drawing and machining operation in slit cutting.

[Step sd01] A determination is made as to whether or not the macro variable #3010 is −1 (minus 1). If the macro variable #3010 is −1 (minus 1) (YES), the process goes to step sd02. If the macro variable #3010 is not −1 (minus 1) (NO), the process goes to step sd03.

[Step sd02] The machining path corresponding to the rectangular hole is executed.

[Step sd03] The machining path for the slits is executed, and the process is ended.

Figure 11:
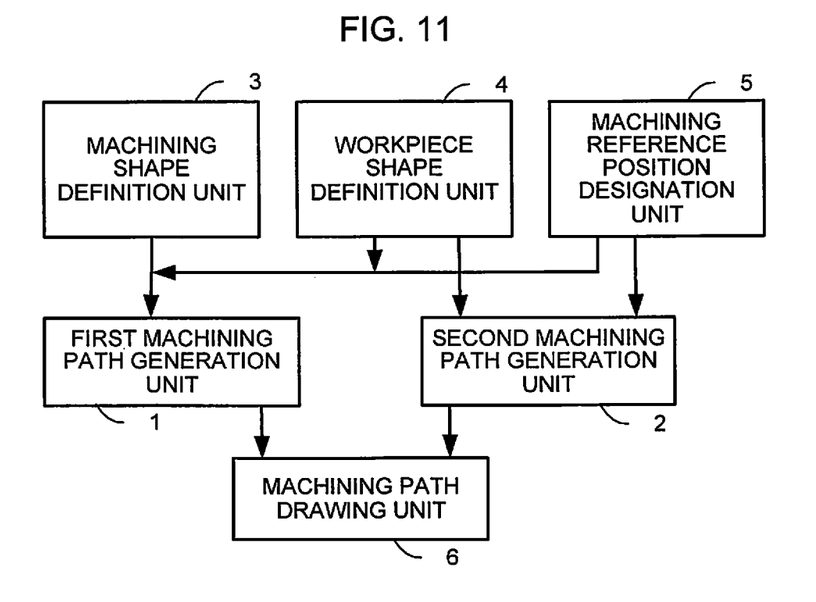
FIG. 11 is a block diagram of a machining program creation apparatus according to the present invention.

FIG. 11 is a block diagram of a machining program creation apparatus of an embodiment of the above-described present invention.

In the first embodiment of the present invention, a machining program creation apparatus for a wire electrical discharge machine for creating a machining program for cutting a predetermined machining shape in an object to be machined includes a machining shape definition unit 3 defining the machining shape; a workpiece shape definition unit 4 defining a shape of the object to be machined; a machining reference position designation unit 5 designating a reference position to be used when the machining shape is machined; a first machining path generation unit 1 for generating a first machining path for cutting the machining shape based on the machining shape, the shape of the object to be machined, and the machining reference position; a second machining path generation unit 2 for generating the shape of the object to be machined as a second machining path based on the shape of the object to be machined and the machining reference position; and a machining path drawing unit 6 for drawing the first and the second machining paths. The machining path drawing unit 6 draws the first machining path and the second machining path on the same screen.

In the second embodiment of the present invention, a machining program creation apparatus for a wire electrical discharge machine for creating a machining program for cutting a keyway in a side surface of a circular hole includes a machining shape definition unit 3 defining a shape of the keyway to be cut; a workpiece shape definition unit 4 designating a diameter of the circular hole; a machining reference position designation unit 5 designating a center position of the circular hole; a first machining path generation unit 1 for generating a first machining path for cutting the keyway based on the shape of the keyway, the diameter of the circular hole, and the center position of the circular hole; a second machining path generation unit 2 for generating the shape of the circular hole as a second machining path based on the diameter of the circular hole and the center position of the circular hole; and a machining path drawing unit 6 for drawing the first and the second machining paths. The machining path drawing unit 6 draws the first machining path and the second machining path on the same screen.

As described above, by using the machining path generator according to the present invention, an operator can visually check the machining position of a machining shape (for example, in example 1, where the keyway is machined in the circular hole of the object to be machined). Accordingly, whether or not a machining path (NC program) generated is correct can be easily and simply checked. Thus, incorrect machining can be prevented in advance.

While embodiments of the present invention have been described above, the present invention is not limited to the above-described examples of the embodiments, but can be carried out in other aspects by making appropriate modifications thereto.

The invention claimed is:

1. A numerical controller for creating a machining program and controlling a wire electrical discharge machine to perform cutting a predetermined machining shape in an object to be machined in accordance with the machining program, the numerical controller comprising a processor, the processor configured to:
   define the machining shape,
   define a shape of the object to be machined,
   designate a machining reference position to be used when the machining shape is machined,
   generate a first machining path for cutting the machining shape in the object to be machined based on the machining shape, the shape of the object to be machined, and the machining reference position,
   generate a second machining path corresponding to the shape of the object to be machined, based on the shape of the object to be machined and the machining reference position,
   draw the first machining path and the second machining path on a same screen, and
   control the wire electrical discharge machine to perform cutting the machining shape in the object along the first machining path, wherein the second machining path displayed on the same screen with the first machining path provides a visual check of a machining position of the machining shape.

2. A numerical controller for creating a machining program and controlling a wire electrical discharge machine to perform cutting a keyway in a side surface of a circular hole in an object to be machined in accordance with the machining program, the numerical controller comprising a processor, the processor configured to:
   define a shape of the keyway to be cut,
   designate a diameter of the circular hole,
   designate a center position of the circular hole,
   generate a first machining path for cutting the keyway based on the shape of the keyway, the diameter of the circular hole, and the center position of the circular hole,
   generate a second machining path corresponding to the circular hole, based on the diameter of the circular hole and the center position of the circular hole,
   draw the first machining path and the second machining path on a same screen, and
   control the wire electrical discharge machine to perform cutting the keyway in the side surface of the circular hole in the object along the first machining path, wherein the second machining path displayed on the same screen with the first machining path provides a visual check of a machining position of the keyway.

3. The numerical controller according to claim 1, wherein the second machining path is a machining path for drawing.

4. The numerical controller according to claim 1, wherein the first machining path and the second machining path are drawn in different ways of displaying.

* * * * *